Jan. 4, 1927.
J. R. FRANCIS
1,613,029
THERMOSTATIC HEAT CONTROL FOR INTERNAL COMBUSTION ENGINES
Filed Nov. 18, 1920
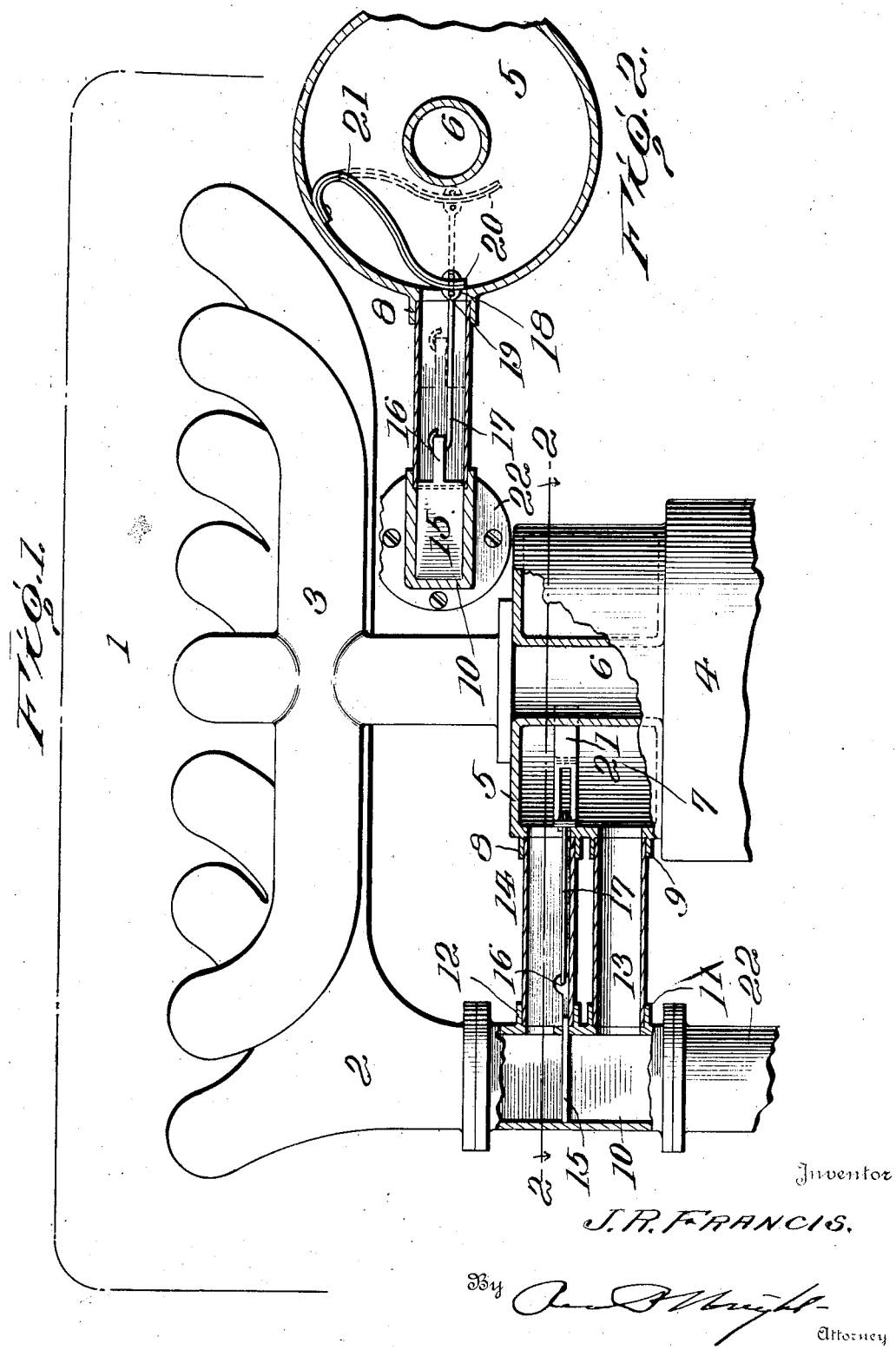
Inventor
J. R. FRANCIS.
By
Attorney Patented Jan. 4, 192                                  1,613,029

UNITED STATES PATENT OFFICE.

JACOB RICHARD FRANCIS, OF FLINT, MICHIGAN.

THERMOSTATIC HEAT CONTROL FOR INTERNAL-COMBUSTION ENGINES.

Application filed November 18, 1920. Serial No. 424,912.

This invention relates to thermostatic heat control for internal combustion engines the object being to provide a novel form of thermostat and valve arrangement for controlling the passage of exhaust gases to a heater disposed between the charge forming device and induction pipe of an internal combustion engine.

A still further object of the invention is to provide a sliding valve and a thermostat arranged within the housing formed by the construction of heater so that these parts will be prevented from being tampered with.

Another and further object of the invention is to provide a construction which is exceedingly simple and cheap to manufacture and which can be readily installed on any of the well known makes of internal combustion engines now in use very cheaply.

Other and further objects and advantages of the invention will be hereinafter set forth and the novel features thereof defined by the appended claims.

In the drawings,

Figure 1 is a side elevation of an internal combustion engine showing the application of my improved construction of thermostatic heat control partly in section; and Figure 2 is a section taken on line 2—2 of Figure 1.

In the drawing 1 indicates an internal combustion engine, 2 the exhaust manifold and 3 the intake manifold. Disposed between the intake manifold 3 and the charge forming device 4 is a casting 5 which is provided with a central carbureting passage 6 in communication with the manifold and the outlet of the carbureter. The carbureting passage 6 is surrounded by a heating chamber 7 which is provided with an inlet nipple 8 and an outlet nipple 9 forming an inlet and outlet for the exhaust gases.

Connected to the exhaust manifold 2 is a valve casing 10 which is provided with an inlet nipple 11 and an outlet nipple 12, the nipples being connected respectively to the inlet and outlet nipples 8 and 9 of the casting 5 by pipes 13 and 14.

Slidably mounted within the valve casing 10 is a valve 15 which is adapted to pass into the pipe 14 when moved outwardly, said valve being provided with an apertured stem 16 to which is connected a link 17 which is provided with an enlargement 18 at its free end having spaced pins 19 between which the bifurcated free end 20 of a bowed thermostatic member 21 is adapted to extend, said thermostatic element being secured to the inner wall of the heating chamber 7 in such a manner that as the thermostatic element is heated it straightens out and causes the valve to be drawn into the position shown in dotted lines in Figure 2 to allow the exhaust gases to pass directly through the valve casing and out the exhaust line pipe 22 which is connected to the valve casing in the usual way and extends to the ordinary muffler.

When the valve is in the position shown in Figure 1, the exhaust gases from the exhaust manifold 2 are diverted throgh the pipe 14 into the heating chamber where they circulate and pass out through the pipe 13 back into the calve casing 10 so as to heat the walls of the carbureting passage which in turn will heat the explosive charge in its passage to the internal combustion engine.

While in this application as well as in my companion applications filed even date herewith Serial Numbers 424,910, 424,911 and 424,913 I have shown a heating chamber disposed between the intake manifold and the charge forming device, I do not wish to limit myself to the particular point of application as my invention consists broadly in providing a heating chamber to heat the explosive charge in its passage to the internal combustion engine containing a thermostat having a connection with a valve for automatically regulating the temperature of the charge delivered to the internal combustion engine and I am aware that the same can be placed at any point in the induction pipe or carbureting passage to accomplish this result without departing from the spirit of my invention.

What I claim is:—

1. An internal combustion engine having an exhaust pipe, intake manifold and charge forming device connected thereto, a heater arranged to heat the charge in its passage to the engine having inlet and outlet pipes connected to the exhaust pipe, a sliding valve disposed in one of said pipes adapted to extend across the exhaust pipe and divert the exhaust gases from said exhaust pipe to said heater, a thermostat disposed within said heater having a loose connection with said valve for controlling the passage of exhaust gases to said heater by the temperature within said heater.

2. An internal combustion engine having an exhaust pipe, intake manifold and charge forming device connected thereto, a heating chamber arranged to heat the charge in its passage to the engine having inlet and outlet pipes connected to the exhaust pipe, a sliding valve disposed in the inlet pipe of said heater working across the passage of said exhaust pipe, a thermostatic member disposed within said heating chamber having a slotted free end, a link connected to said valve having spaced pins at its free end, the slotted end of said thermostatic member extending between said pins forming a sliding connection between said link and thermostatic member.

3. An internal combustion engine having an exhaust pipe, intake manifold and charge forming device connected thereto, a heater arranged to heat the charge in its passage from said charge forming device to the internal combustion engine, said heater being in communication with said exhaust pipe through spaced unclosable passages, a valve working in one of said passages and capable of being extended across the passage of said exhaust pipe for diverting the exhaust gases from said exhaust pipe through one of said passages into the heating chamber, a link connected to said valve having spaced pins at its ends and a bowed thermostatic member disposed within said heating chamber having a slotted free end embracing said link between said pins for actuating said valve for controlling the passage of exhaust gases to said heating chamber.

In testimony whereof I have hereunto affixed my signature.

JACOB RICHARD FRANCIS.